United States Patent
Jenum et al.

(10) Patent No.: US 9,790,720 B2
(45) Date of Patent: Oct. 17, 2017

(54) TORQUE ELEMENT RETENTION SYSTEM

(71) Applicant: REELL PRECISION MANUFACTURING CORPORATION, St. Paul, MN (US)

(72) Inventors: Timothy W. Jenum, St. Paul, MN (US); George Larson, Roseville, MN (US)

(73) Assignee: Reell Precision Manufacturing Corporation, St. Paul, MN (US)

( * ) Notice: Subject to any disclaimer, the term of this patent is extended or adjusted under 35 U.S.C. 154(b) by 14 days.

(21) Appl. No.: 14/482,785

(22) Filed: Sep. 10, 2014

(65) Prior Publication Data
US 2015/0071735 A1 Mar. 12, 2015

Related U.S. Application Data

(60) Provisional application No. 61/876,037, filed on Sep. 10, 2013.

(51) Int. Cl.
| | | |
|---|---|---|
| *E05D 5/12* | (2006.01) | |
| *F16B 2/24* | (2006.01) | |
| *E05D 11/08* | (2006.01) | |

(52) U.S. Cl.
CPC ............ *E05D 5/128* (2013.01); *E05D 11/082* (2013.01); *F16B 2/24* (2013.01); *E05Y 2900/606* (2013.01);
(Continued)

(58) Field of Classification Search
CPC . Y10T 16/54038; Y10T 16/5403; E05D 5/12; E05D 5/128; E05D 11/082;
(Continued)

(56) References Cited

U.S. PATENT DOCUMENTS

| 351,936 A | 11/1886 | Pfingst |
|---|---|---|
| 1,166,551 A | 1/1916 | Simmons |

(Continued)

FOREIGN PATENT DOCUMENTS

| WO | 9720125 | 6/1997 |
|---|---|---|
| WO | 02084056 | 10/2002 |

OTHER PUBLICATIONS

The International Search Report and the Written Opinion for International Application No. PCT/US2014/054978 dated Nov. 24, 2014 (14 pages).

*Primary Examiner* — William Miller
(74) *Attorney, Agent, or Firm* — Dicke, Billig & Czaja, PLLC

(57) ABSTRACT

One aspect is a torque element retention system with a housing having an opening. A torque assembly has a shaft and a torque element stacked along the shaft and is configured substantially within the opening of the housing. The torque element has an arm portion and a foot portion and the opening has an arm opening section configured to receive the arm portion of the torque element and a foot retention section configured to receive the foot portion of the torque element. The torque element retention system has a system axis through the center of the shaft and extending through the foot retention section. The at least one of the first and second foot end portions of the foot retention section includes first and second non-parallel segments having no normal length to chord length ratio greater than 0.5.

11 Claims, 12 Drawing Sheets

(52) U.S. Cl.
CPC .... *Y10T 16/54038* (2015.01); *Y10T 29/49826* (2015.01)

(58) Field of Classification Search
CPC .... E05Y 2900/606; F16B 2/24; F16B 21/186; G06F 1/1616; G06F 1/1681
USPC ................ 16/337, 342; 411/517; 361/679.27
See application file for complete search history.

(56) References Cited

U.S. PATENT DOCUMENTS

| | | |
|---|---|---|
| 2,462,304 A | 2/1949 | Burdick |
| 2,605,926 A | 8/1952 | Casey |
| 3,030,783 A | 4/1962 | Schmidt |
| 3,213,500 A | 10/1965 | Thompson |
| 3,395,553 A | 8/1968 | Stout |
| 3,765,054 A | 10/1973 | Johnson |
| 4,190,929 A | 3/1980 | Palka |
| 4,227,283 A | 10/1980 | Mathewson et al. |
| 4,688,961 A | 8/1987 | Shioda et al. |
| 4,790,504 A | 12/1988 | Wills et al. |
| 4,916,968 A | 4/1990 | Kabaya |
| 4,986,507 A | 1/1991 | Chiang |
| 5,010,983 A | 4/1991 | Kitamura |
| 5,018,244 A | 5/1991 | Hino |
| 5,037,231 A | 8/1991 | Kitamura |
| 5,041,818 A | 8/1991 | Liu |
| 5,043,846 A | 8/1991 | Kinoshita |
| 5,052,078 A | 10/1991 | Hosoi |
| 5,064,137 A | 11/1991 | Komatsu |
| 5,088,156 A | 2/1992 | Hosoi |
| 5,108,062 A | 4/1992 | Detwiler |
| 5,197,704 A | 3/1993 | Kitamura |
| 5,211,368 A | 5/1993 | Kitamura |
| 5,219,240 A | 6/1993 | Kitamura |
| 5,231,734 A | 8/1993 | Rude |
| 5,235,494 A | 8/1993 | Chang et al. |
| 5,354,028 A | 10/1994 | Kitamura |
| 5,364,149 A | 11/1994 | Aymerich et al. |
| 5,491,874 A | 2/1996 | Lowry et al. |
| 5,509,176 A | 4/1996 | Karl |
| 5,697,125 A * | 12/1997 | Gannon ................ E05D 11/082 16/342 |
| 6,301,748 B1 * | 10/2001 | Su-Man ................ G06F 1/1616 16/337 |
| RE37,712 E | 5/2002 | Gannon |
| 6,467,129 B1 * | 10/2002 | Bae ........................ B60J 3/0265 16/308 |
| 6,530,123 B1 | 3/2003 | Wahlstedt |
| 7,257,863 B2 * | 8/2007 | Horng ...................... E05D 5/12 16/342 |
| 7,607,202 B1 * | 10/2009 | Lee ....................... G06F 1/1616 16/342 |
| 7,958,600 B2 * | 6/2011 | Kuo ...................... G06F 1/1616 16/342 |
| 8,245,356 B2 * | 8/2012 | Chu ....................... G06F 1/1681 16/342 |
| 8,875,348 B2 * | 11/2014 | Kossett ................ G06F 1/1681 16/342 |
| 2002/0144378 A1 * | 10/2002 | Liao ..................... G06F 1/1681 16/342 |
| 2005/0066475 A1 | 3/2005 | Minami |
| 2007/0094845 A1 | 5/2007 | Chang et al. |
| 2007/0101543 A1 | 5/2007 | Lu et al. |
| 2007/0283534 A1 * | 12/2007 | Chang .................. G06F 1/1616 16/342 |
| 2008/0047101 A1 | 2/2008 | Petermann et al. |
| 2009/0293229 A1 | 12/2009 | Chiang |
| 2012/0174339 A1 | 7/2012 | Novin |
| 2014/0059805 A1 | 3/2014 | Krahn et al. |

* cited by examiner

TORQUE ELEMENT RETENTION SYSTEM

CROSS REFERENCE TO RELATED APPLICATIONS

This Non-Provisional patent application claims the benefit of the filing date of U.S. Provisional Patent Application Ser. No. 61/876,037, filed Sep. 10, 2013, entitled "CLIP RETENTION SYSTEM," which is herein incorporated by reference.

BACKGROUND

Clip hinge or torque element friction devices provide reliable, reasonable-cost, relatively small torque packages for hinging one element relative to another with a long tool life. In some cases, the size and performance requirements dictate that these devices are cast zinc, which may have a low fatigue limit compared to ferrous materials and some aluminum alloys. The use of zinc may require larger section areas to lower stresses to avoid catastrophic fatigue, and many applications do not have the required space. In addition, such zinc cast devices may experience creep over time, which can loosen press fits allowing freeplay in the application. Zinc cast parts also lack intrinsic corrosion protection, and may accordingly require secondary plating operations. Although cosmetic surface finishes are achievable with die cast zinc, these add processing time, cost, need for inspection and often quality problems. Even where space is available for the larger sections that zinc may require, there may be weight limitations that prohibit its use. For these and other reasons, there is a need for the present invention.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1A:
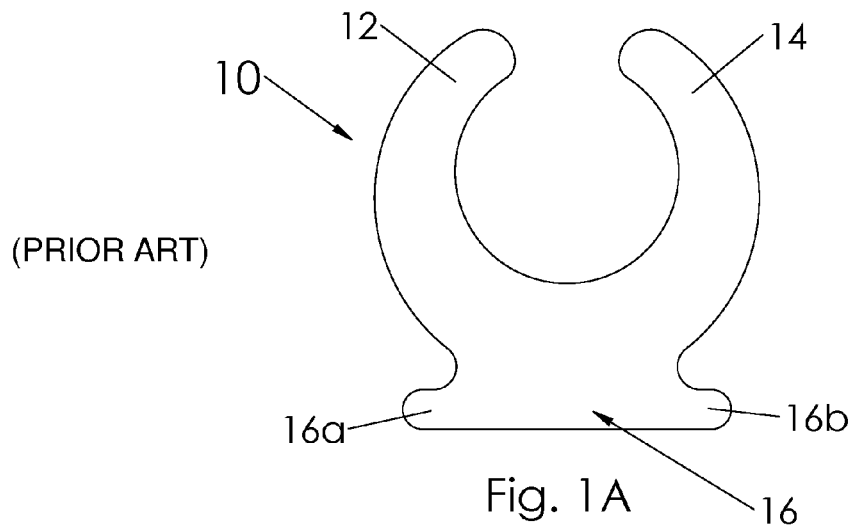
FIG. 1A is a front view of a friction clip in accordance with the prior art.
Figure 1B:
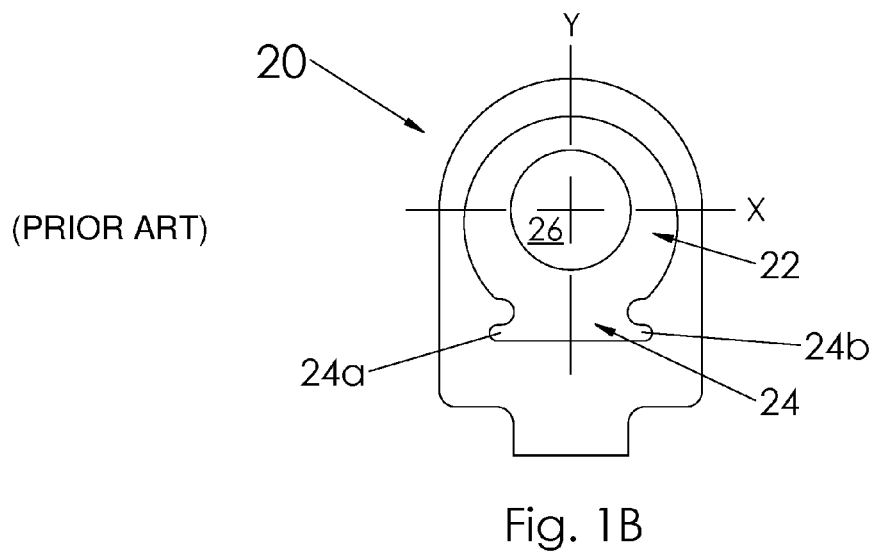
FIG. 1B is a front view of a housing for a friction clip in accordance with the prior art.
Figure 1C:
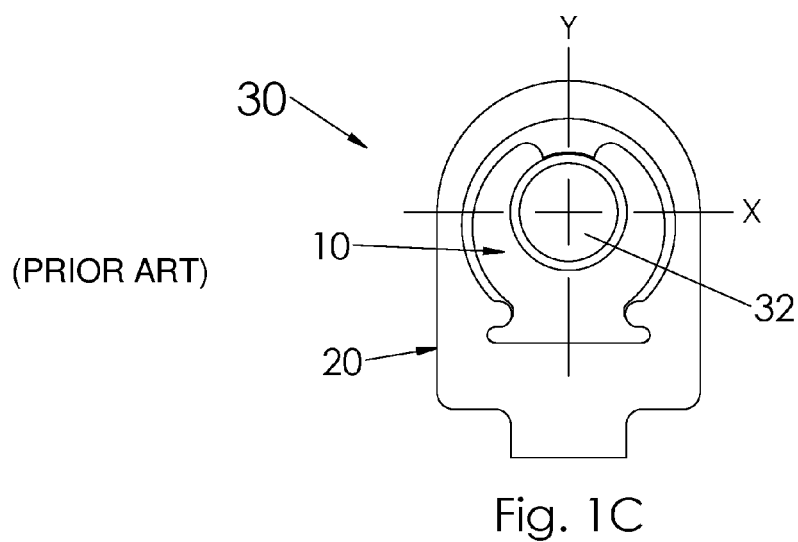
FIG. 1C is a front view of a friction clip assembly within a housing in accordance with the prior art.

FIGS. 1A-1C illustrate known torque element retention system 30, including various parts thereof. Torque element retention system 30 includes torque element 10 and housing 20. Torque element 10 includes first and second arms 12 and 14 and a foot portion 16, including first and second projections 16a and 16b. Housing is configured with an opening 26, including an arm opening section 22 configured to receive first and second arms 12 and 14 of torque element 10, and a foot retention section 24 configured to receive the foot portion 16 of torque element 10.

In FIG. 1C, an x-y axis is illustrated relative to torque element retention system 30. In the illustration, the y-axis is parallel to a system axis that extends through the center of shaft 32 and extends through approximately the middle of foot portion 24 such that first and second projecting sections 24a and 24b extend normal from the system axis in opposite directions in approximately equal distance. The x-axis is perpendicular to the y-axis.

Typically, a plurality of torque elements 10 is stacked along a shaft 32 in an interference fit. The assembly of torque elements 10 stacked along shaft 32 are inserted in opening 26 of housing 20, such that first and second arms 12 and 14 are configured in arm opening section 22 and foot portion 16 is configured in foot retention section 24. Although there is clearance between housing 20 and the first and second arms 12 and 14 in arm opening section 22, the foot portion 16 is press fit into foot retention section 24.

As such, when housing 20 is rotated relative to shaft 32, torque elements 10 are not allowed to rotate relative to housing 20 by virtue of the press fit of foot portion 16 into foot retention section 24. As a result, shaft 32 rotates within the first and second arms 12 and 14 producing a consistent and repeatable torque. This basic configuration is disclosed in U.S. Pat. RE37,712, which is owned by Applicant and hereby incorporated by reference in its entirety.

Figure 1D:
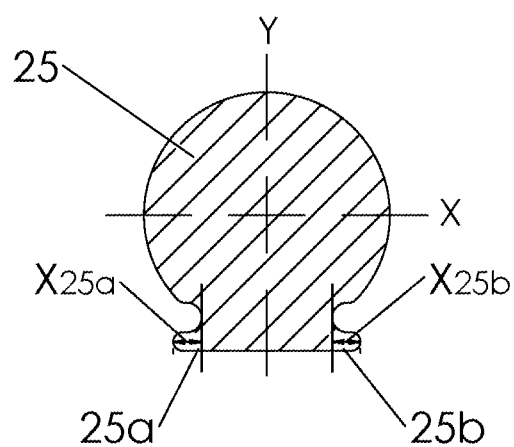
FIG. 1D is a cross-sectional view of a core pin for making a housing in accordance with the prior art.

Forming housing 20 and opening 26 is typically accomplished using a zinc die casting method. For zinc die casting, a core pin, such as core pin 25 in FIG. 1D, is used to form opening 26 in housing 20. A typical molding temperature for the zinc die case process is generally about 800 degrees Fahrenheit, and the cycle time is generally only several seconds. With such parameters, the molten zinc flows with relatively little friction.

The required shape of core pin 25 presents challenges in forming housing 20, however, because of the configuration of torque element retention system 30. Specifically, because torque element 10 has foot portion 16 with first and second projections 16a and 16b that are quite thin, housing 20 must be formed with a complementary shaped foot section retention 24 that also has first and second projecting sections 24a and 24b that are and configured to receive first and second projections 16a and 16b. As such, core pin 25 includes thin extending first and second projections 25a and 25b to form first and second projecting sections 24a and 24b in housing 20. As illustrated in FIG. 1D, these projections 25a and 25b extend first and second lengths $X_{25a}$ and $X_{25b}$ in the x-axis direction, which each are relatively long dimensions compared to a relatively small dimension in the y-axis direction.

This relatively "long and thin" configuration of the projections causes problems and limitations in forming housing 20. Although such dimensions of core pin projections result in acceptable wear of core pin 25 during zinc molding, other types of molding cannot be used. For example, these configurations of projections cannot be die casted in aluminum and other higher-temperature materials. Aluminum needs a molding temperature above 1,200 degrees Fahrenheit, and it is more abrasive than zinc. Consequently, the core pin projections 25a and 25b in FIG. 1D get too hot during molding with aluminum, and additional cooling is difficult because of the constrained space. The result is rapid tool wear and/or breakage. Configurations with long and thin projections such as torque element retention system 30 of FIG. 1C cannot be molded with high-temperature molding. This eliminates many otherwise desirable materials, such as aluminum, for housing 20 of torque element retention system 30.

The long and thin configuration of the projections in housing 20 is especially problematic when torque element retention system 30 is required to have very small absolute dimensions. In such a case, core pin projections 25a and 25b are almost "fin-like" and are very susceptible to high-heat damage and breakage. For a housing 20 requiring a core pin 25 with projections 25a and 25b having first and second lengths $X_{25a}$ and $X_{25b}$ of more than 1 mm and height in the y-axis direction of less than 1 mm, die cast molding with a high-temperature material such as aluminum is not practical. At these small dimensions, there will be premature wear and early core pin breakage causing impractical time, expense and extraordinary tool maintenance.

Figure 2A:
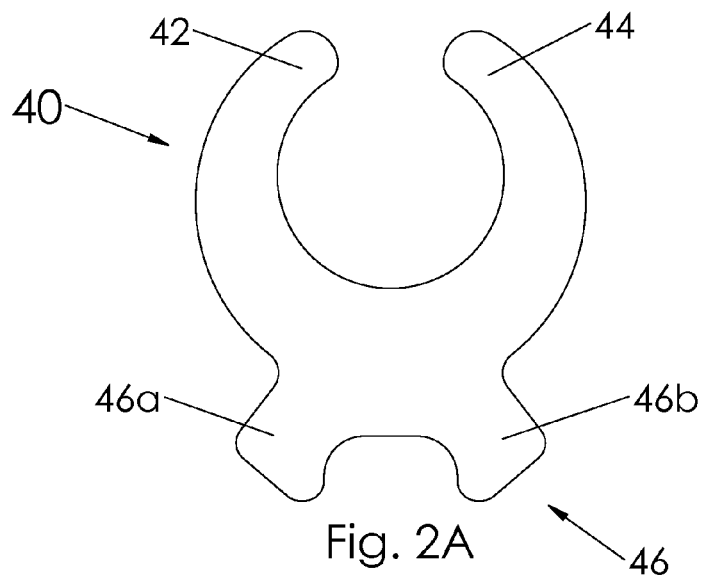
FIG. 2A is a front view of a friction clip in accordance with accordance with one embodiment.
Figure 2B:
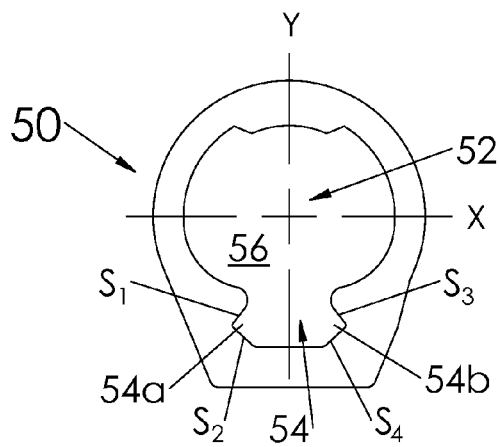
FIG. 2B is a front view of a housing for a friction clip in accordance with one embodiment.
Figure 2C:
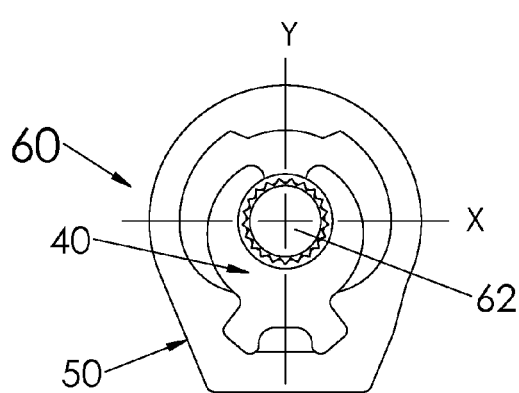
FIG. 2C is a front view of a friction clip assembly within a housing in accordance with one embodiment.

FIGS. 2A-2C illustrate torque element retention system 60, including various parts thereof, in accordance with one embodiment. Torque element retention system 60 includes torque element 40 and housing 50. Torque element 40 includes first and second arms 42 and 44 and a foot portion 46, including first and second projections 46a and 46b. Housing 50 is configured with an opening 56, including an arm opening section 52 configured to receive first and second arms 42 and 44 of torque element 40, and a foot retention section 54 configured to receive the foot portion 46 of torque element 40.

In FIG. 2C, an x-y axis is illustrated relative to torque element retention system 60. In the illustration, the y-axis is parallel to a system axis that extends through the center of shaft 62 and extends through approximately the middle foot retention section 54 such that first and second foot end portions 54a and 54b extend normal from the system axis in opposite directions in approximately equal distance. The x-axis is perpendicular to the y-axis.

A plurality of torque elements 40 is stacked along a shaft 62 in an interference fit. The assembly of torque elements 40 stacked along shaft 62 are inserted in opening 56 of housing 50, such that first and second arms 42 and 44 are configured in arm opening section 52 and foot portion 46 is configured in foot retention section 54. Although there is clearance between housing 50 and the first and second arms 42 and 44 in arm opening section 52, the foot portion 46 is press fit into foot retention section 54.

As such, when housing 50 is rotated relative to shaft 62, torque elements 40 are not allowed to rotate relative to housing 50 by virtue of the press fit of foot portion 46 into foot retention section 54. As a result, shaft 62 rotates within the first and second arms 42 and 44 producing a consistent and repeatable torque. First and second arms 42 and 44 are resilient and allowed to flex, because unlike foot portion 46 first and second arms 42 and 44 are not in contact with housing 50. It is also noted that although first and second arms 42 and 44 are illustrated as being equal in length, arms of differing length are also consistent with the various embodiments described herein.

Foot retention section 54 has first and second foot end portions 54a and 54b, which are shaped to firmly hold foot portion 46 of torque element 40 in a press fit, and also to avoid long and thin dimensions associated with housing 20 above. In one embodiment, first foot end portion 54a is defined by first and second segments $S_1$ and $S_2$, while second foot end portion 54b is defined by third and fourth segments $S_3$ and $S_4$. In one embodiment, first and second segments $S_1$ and $S_2$ are oriented at nearly right angles relative to each other, as are third and fourth segments $S_3$ and $S_4$, such that first and second foot end portions 54a and 54b relatively short and wide, rather than the long and thin projections associated with housing 20. In one embodiment, the point of intersection between first and second segments $S_1$ and $S_2$ is at the furthest point of foot retention section 54 from the system axis, that is, the furthest point from approximately the middle of foot retention section 54.

Figure 2D:
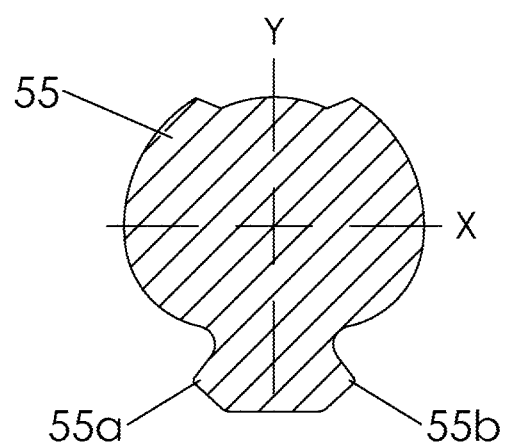
FIG. 2D is a cross-sectional view of a core pin for making a housing in accordance with one embodiment.

Accordingly, one embodiment of housing 50 is formed using conventional aluminum die casting. FIG. 2D illustrates core pin 55 that is used in die casting housing 50 in aluminum. The relatively short and wide configuration of foot retention section 54, and particularly first and second foot end portions 54a and 54b, allow housing 50 to be die casted with no secondary operations to the housing 50, and with no damage to core pin 55, even at high temperatures over 1,000 degrees Fahrenheit.

Because housing 50 can be die casted in aluminum, its design allows for pressing foot portion 46 of torque element 40 into foot retention section 54 without substantial deformation to the torque element 40 or to housing 50, while still retaining the correct location of torque element 40 with respect to housing 50. The unique configuration of foot retention section 54 provides resistance to torque (anti-rotation) relative to torque element 40 without looseness therebetween. The configuration of foot retention section 54 further provides secure and accurate mounting for a torque element 40 in three dimensions and allows for mounting of multiple torque elements 40.

Figure 3:
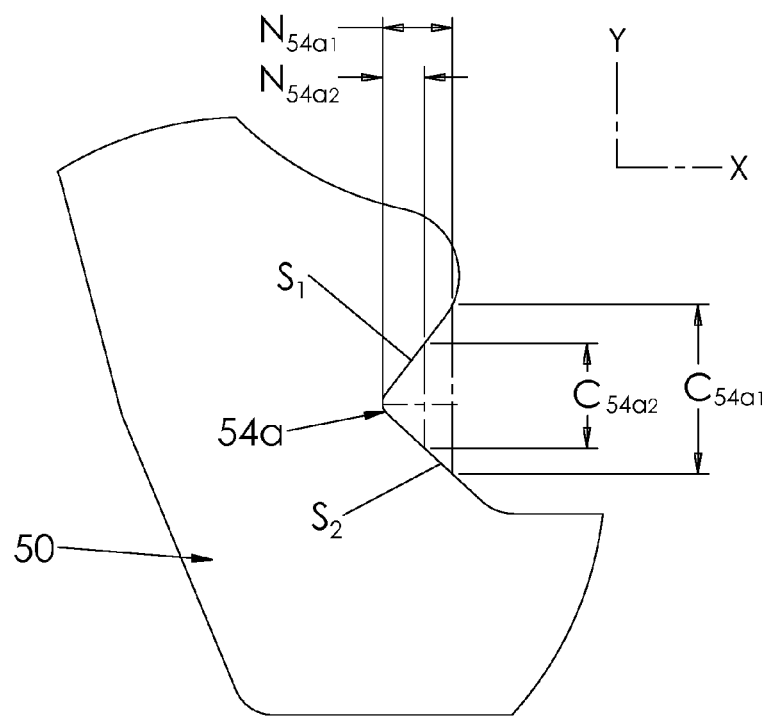
FIG. 3 is a partial view of a housing illustrating a foot retention portion in accordance with one embodiment.

FIG. 3 is a partial view of housing 50 (which is fully illustrated in FIG. 2B) including foot retention portion 54, and particularly first foot end portion 54a in accordance with one embodiment. As illustrated, first foot end portion 54a includes first segment $S_1$ and second segment $S_2$. It is the unique configuration of first foot end portion 54a, which is short and wide, that produces advantages in housing 50 and torque element retention system 60. Because the partial view of housing 50 in FIG. 3 is taken from the fully illustrated housing 50 in FIGS. 2B and 2C, the x-y axis defined relative to retention system 60 is accordingly replicated in FIG. 3.

In one embodiment, first segment $S_1$ and second segment $S_2$ of first foot end portion 54a are configured to be joined along an arc such that points connected from one segment to the other along the y-axis can be defined as a chord length $C_{54a1}$, $C_{54a2}$, that is, the distance between one point on first segment $S_1$ and one point on second segment $S_2$, with both points lying along a line parallel to the y-axis. Furthermore, a normal length $N_{54a1}$, $N_{54a2}$ is defined as the distance of a line extending perpendicular or normal from the chord length $C_{54a1}$, $C_{54a2}$ to the location where first segment $S_1$ and second segment $S_2$ intersect. In order to ensure that first foot end portion 54a has a configuration with the advantages described above, the ratio of the normal length $N_{54a1}$, $N_{54a2}$ to the corresponding chord length $C_{54a1}$, $C_{54a2}$ should be no larger than 0.5.

For example, for housing 50 illustrated in FIGS. 2B-2C and 3, chord lengths were measured along six lines perpendicular to the y-axis from a point on first segment $S_1$ to a point on second segment $S_2$. These measurements were taken at six various chord distances from the intersection of first and second segments $S_1$ and $S_2$, two of which $C_{54a1}$ and $C_{54a2}$ are illustrated in FIG. 3 (in order to simplify the figure). A corresponding normal length $N_{54a1}$, $N_{54a2}$ (again, for simplicity only two shown) was then taken from each chord line to the intersection of first and second segments $S_1$ and $S_2$. In one embodiment, the six measured chord lengths $C_{54a1}$-$C_{54a6}$ were 0.43 mm, 0.64 mm, 0.82 mm, 1.02 mm, 1.22 mm and 1.76 mm, with the respective normal lengths $N_{54a1}$-$N_{54a6}$ being 0.1 mm, 0.2 mm, 0.3 mm, 0.4 mm, 0.5 mm and 0.69 mm.

Figure 5:
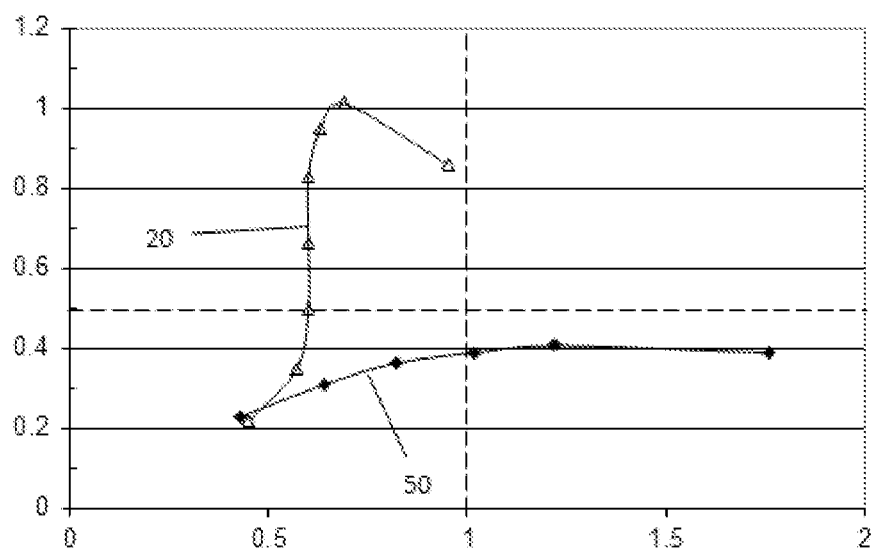
FIG. 5 is a graph plotting chord length against ratios of normal length over chord lengths for various configurations.

The ratio of the normal length to chord length was then plotted against the chord distance for each of the six chord distances, as illustrated in FIG. 5, labeled as line 50, that is, corresponding to housing 50. As is evident from line 50 of FIG. 5, every ratio of measured normal length to chord length is less than 0.5. Accordingly, a housing configured such as housing 50 having a foot retention section with first and second segments $S_1$ and $S_2$ with a normal length to chord length ratio less than 0.5 is a "short and wide" foot retention section that can be die cast in a high-temperature metal and has the requisite advantages. A housing configured such as housing 50 eliminates the very thin tooling sections subjected to high temperatures, as was required by the prior systems.

Figure 4:
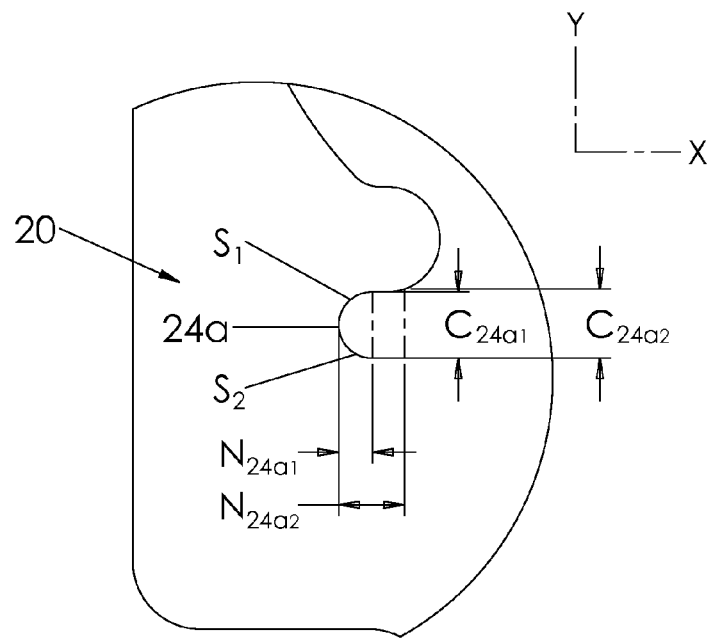
FIG. 4 is a partial view of a housing illustrating a foot retention portion in accordance with the prior art.

By contrast, the design associated with system 10 in FIGS. 1A-1D does not meet this configuration. FIG. 4 is a partial view of housing 20 (which is fully illustrated in FIG. 1B) including projecting section 24a. As illustrated, projecting section 24a also includes a first segment $S_1$ and second segment $S_2$. As will be evident, the configuration of projecting section 24a and corresponding first and second segments $S_1$ and $S_2$ are long and narrow and do not have the advantage of housing 50 and torque element retention system 60.

For housing 20 illustrated in FIGS. 1B-1C and 4, just like housing 50 just described, chord lengths were measured along eight lines perpendicular to the y-axis from a point on first segment $S_1$ to a point on second segment $S_2$. These measurements were taken at eight various chord distances from the intersection of first and second segments $S_1$ and $S_2$, two of which $C_{24a1}$ and $C_{24a2}$ are illustrated in FIG. 4 (in order to simplify the figure). A corresponding normal length $N_{24a1}$, $N_{24a2}$ was then taken from each chord line to the intersection of first and second segments $S_1$ and $S_2$. In one embodiment, the eight measured chord lengths $C_{24a1}$-$C_{24a8}$ were 0.45 mm, 0.57 mm, 0.6 mm, 0.6 mm, 0.6 mm, 0.63 mm, 0.69 mm and 0.95 mm, with the respective normal lengths $N_{24a1}$-$N_{24a8}$ being 0.1 mm, 0.2 mm, 0.3 mm, 0.4 mm, 0.5 mm, 0.6 mm, 0.7 mm and 0.82 mm.

The ratio of the normal length to chord length was then plotted against the chord distance for each of the eight chord distances, as illustrated in FIG. 5, labeled as line 20, i.e, corresponding to housing 20. As is evident from line 20 in FIG. 5, most of the ratios of measured normal length to chord length are more than 0.5. Accordingly, a housing configured such as housing 20, having a foot retention section with first and second segments $S_1$ and $S_2$ with a normal length to chord length more than 0.5, is a long and thin section that cannot be die cast in a high-temperature metal and will not have the requisite advantages.

Attempting to die cast such a long and thin configuration in a high-temperature metal, such as aluminum or any metal requiring a casting temperature over 1,000 degrees Fahrenheit, will cause premature wear or damage to the core pin projections and will not be a repeatable process for a multitude of parts, as was discussed above relative to core pin 25 in FIG. 1D.

The short and wide configuration of housing 50, however, will provide a housing opening 56 that is configured to have a decreased sensitivity to draft requirements, thereby allowing for torque element 40 to be more readily press fit into housing 50 than does a long and narrow configuration. Furthermore, the configuration of housing 50 requires no secondary operations to achieve the press fit. Torque elements 40, and specifically foot portion 46, will be self-broaching into foot retention section 54 of housing 50. With the long and narrow configuration of housing 20, it is sometimes necessary to reduce draft with a secondary operation to allow torque element 10 to press fit into the housing 20, thereby adding process operations and costs.

The short and wide configuration of housing 50 also allows the use of a variety of material hardnesses, from soft to semi-hard. The configuration is also consistent with existing die cast processing capabilities of several materials, consistent with their capability regarding dimensional tolerances, and consistent with the ability to achieve certain size features without premature tool wear or maintenance.

The short and wide configuration of housing 50 also requires no extra parts in order to achieve reliable retention of torque elements 40 by housing 50. For some prior configurations, the addition of compliant material(s) is required in order to achieve a press fit of torque elements and the housing. This is avoided with the configuration of housing 50. Also, the configuration of housing 50 is capable of handling a range of material moduli, while still ensuring torque element retention.

Although FIGS. 2B-2C and 3 illustrated one embodiment of housing 50 having short and wide configuration of foot retention portion 54, including a configuration having segments with a normal length to chord length ratio less than 0.5, other configurations are also possible.

Figure 6A:
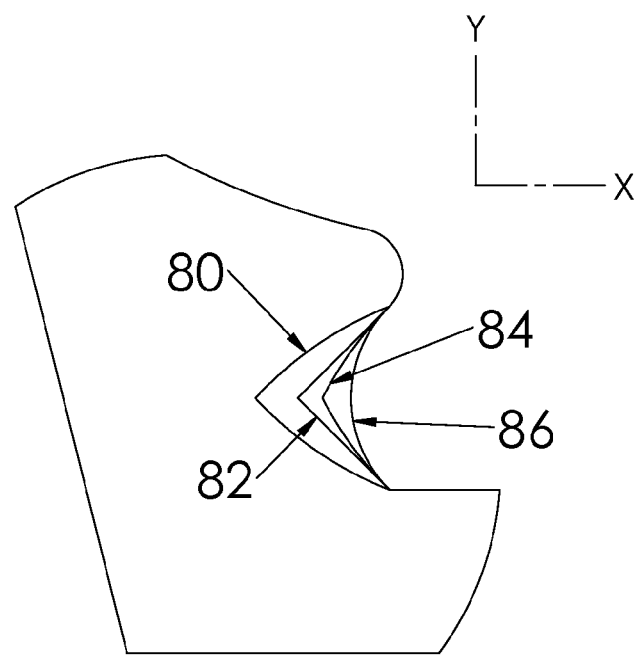
FIGS. 6A-6E are partial views of a housing illustrating various configurations of a foot retention portion in accordance with various embodiments.

Accordingly, FIG. 6A illustrates four alternative configurations of foot retention sections, such as foot retention section 54. In FIG. 6A, foot end portions 80, 82, 84, and 86, which are analogous to foot end portion 54a illustrated in FIG. 3, are illustrated for relative comparison. In each alternative case, foot end portions 80, 82, 84, and 86 are substituted for foot end portion 54a. A symmetrical (or other) configuration can be selected for a second foot end portion to configure a foot retention section, such as foot retention section 54. A complete torque element retention system would then be essentially as illustrated in FIGS. 2A-2C, with these modifications made for foot end portions 80, 82, 84, and 86, and a complementary modification to the torque elements. Because these partial views of foot end portions 80, 82, 84, and 86 in FIGS. 6A-6E are taken from the fully illustrated housing 50 in FIGS. 2B and 2C, the x-y axis defined relative to retention system 60 is accordingly replicated in FIGS. 6A-6E.

Figure 6B:
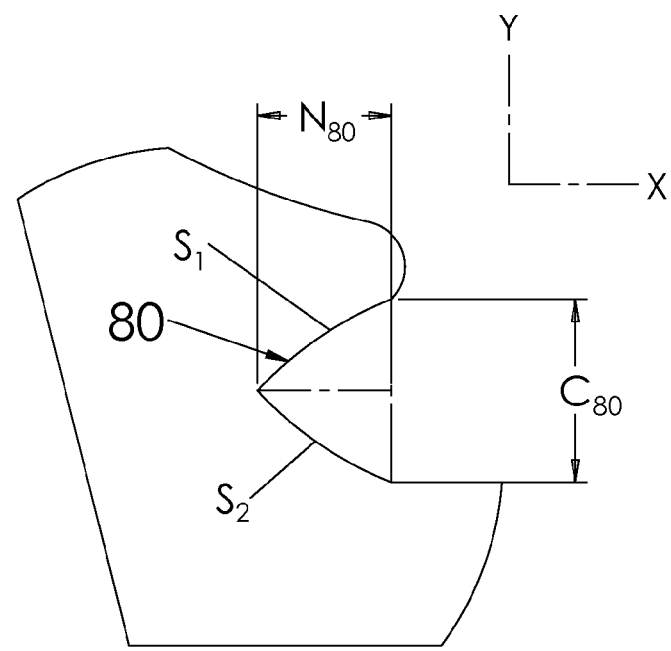

FIG. 6B illustrates foot end portion 80, which includes first segment $S_1$ and second segment $S_2$. As with the embodiment illustrated in FIG. 3, first segment $S_1$ and second segment $S_2$ of foot end portion 80 in FIG. 6B are configured to be joined along an arc such that points connected from one segment to the other along the y-axis can be defined as a chord length $C_{80}$, that is, the distance between one point on first segment $S_1$ and one point on second segment $S_2$, with both points lying along a line parallel to the y-axis. Furthermore, a normal length $N_{80}$ is defined as the distance of a line extending perpendicular or normal from the chord length $C_{80}$ to the location where first segment $S_1$ and second segment $S_2$ intersect.

As with the examples above, chord lengths were measured along eight lines perpendicular to the y-axis from a point on first segment $S_1$ to a point on second segment $S_2$. These measurements were taken at eight various chord distances from the intersection of first and second segments $S_1$ and $S_2$, one of which $C_{80}$ is illustrated in FIG. 6B (in order to simplify the figure). A corresponding normal length $N_{80}$ was then taken normal from each chord line to the intersection of first and second segments $S_1$ and $S_2$. In one embodiment, the eight measured chord lengths $C_{80(1)}$-$C_{80(8)}$ were 0.16 mm, 0.30 mm, 0.45 mm, 0.58 mm, 0.71 mm, 0.84, 1.00 and 1.17 mm, with the respective normal lengths $N_{80(1)}$-$N_{80(8)}$ being 0.10 mm, 0.20 mm, 0.30 mm, 0.40 mm, 0.50 mm, 0.60 mm, 0.74 mm and 0.79 mm.

Figure 7:
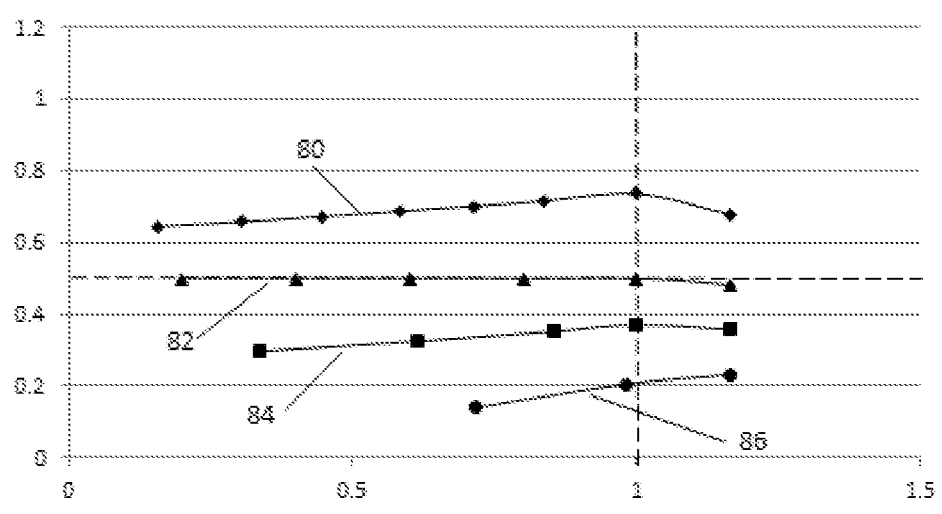
FIG. 7 is a graph plotting chord length against ratios of normal length over chord lengths for various configurations.

The ratio of the normal length to chord length was then plotted against the chord distance for each of the eight chord distances, as illustrated in FIG. 7, labeled as line 80, that is, corresponding to foot end portion 80. As is evident from line 80 of FIG. 7, every ratio of measured normal length to chord length is more than 0.5. Accordingly, a housing configured with a foot end portion 80, having a foot retention section with first and second segments $S_1$ and $S_2$ with a normal length to chord length more than 0.5, is a long and thin section that is impractical to die cast in a high-temperature metal and will not have the requisite advantages of the configuration illustrated in FIG. 3.

Figure 6C:
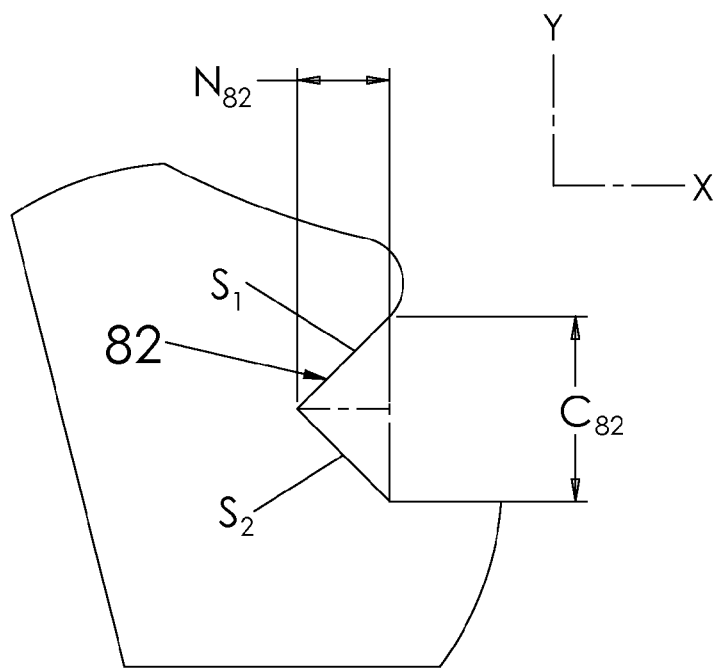

FIG. 6C illustrates foot end portion 82, which includes first segment $S_1$ and second segment $S_2$. As with the embodiment just described, first segment $S_1$ and second segment $S_2$ of foot end portion 82 in FIG. 6C are configured to be joined along an arc such that points connected from one segment to the other along the y-axis can be defined as a chord length $C_{82}$, that is, the distance between one point on first segment $S_1$ and one point on second segment $S_2$, with both points lying along a line parallel to the y-axis. Furthermore, a normal length $N_{82}$ is defined as the distance of a line extending perpendicular or normal from the chord length $C_{82}$ to the location where first segment $S_1$ and second segment $S_2$ intersect.

As with the examples above, chord lengths were measured along six lines perpendicular to the y-axis from a point on first segment $S_1$ to a point on second segment $S_2$. These measurements were taken at six various chord distances from the intersection of first and second segments $S_1$ and $S_2$, one of which $C_{82}$ is illustrated in FIG. 6C (in order to simplify the figure). A corresponding normal length $N_{82}$ was then taken normal from each chord line to the intersection of first and second segments $S_1$ and $S_2$. In one embodiment, the six measured chord lengths $C_{82(1)}$-$C_{82(6)}$ were 0.20 mm, 0.40 mm, 0.60 mm, 0.80 mm, 1.00 and 1.17 mm, with the respective normal lengths $N_{82(1)}$-$N_{82(6)}$ being 0.10 mm, 0.20 mm, 0.30 mm, 0.40 mm, 0.50 mm, and 0.56 mm.

The ratio of the normal length to chord length was then plotted against the chord distance for each of the five chord distances, as illustrated in FIG. 7, labeled as line 82, that is, corresponding to foot end portion 82. As is evident from line 82 of FIG. 7, every ratio of measured normal length to chord length no more than 0.5. Accordingly, a housing configured with a foot end portion 84, having first and second segments $S_1$ and $S_2$ with a normal length to chord length ratio of no more than 0.5 is a "short and wide" foot retention section that can be die cast in a high-temperature metal and has the requisite advantages discussed above. Because the configuration of foot end portion 82 is at the limit of 0.5, however, any similar configuration having even a slightly longer normal length would become increasingly impractical to mold in high temperature metals without suffering the afore-mentioned detrimental effects.

Figure 6D:
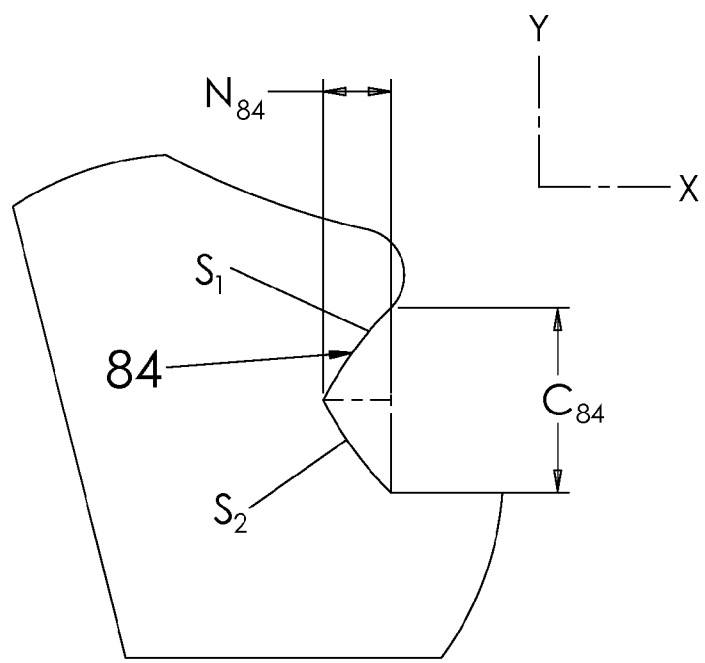

FIG. 6D illustrates foot end portion 84, which includes first segment $S_1$ and second segment $S_2$. As with the embodiment just described, first segment $S_1$ and second segment $S_2$ of foot end portion 84 in FIG. 6D are configured to be joined along an arc such that points connected from one segment to the other along the y-axis can be defined as a chord length $C_{84}$, that is, the distance between one point on first segment $S_1$ and one point on second segment $S_2$, with both points lying along a line parallel to the y-axis. Furthermore, a normal length $N_{84}$ is defined as the distance of a line extending perpendicular or normal from the chord length $C_{84}$ to the location where first segment $S_1$ and second segment $S_2$ intersect.

As with the examples above, chord lengths were measured along five lines perpendicular to the y-axis from a point on first segment $S_1$ to a point on second segment $S_2$. These measurements were taken at five various chord distances from the intersection of first and second segments $S_1$ and $S_2$, one of which $C_{84}$ is illustrated in FIG. 6D (in order to simplify the figure). A corresponding normal length $N_{84}$ was then taken from each chord line to the intersection of first and second segments $S_1$ and $S_2$. In one embodiment, the five measured chord lengths $C_{84(1)}$-$C_{84(5)}$ were 0.34 mm, 0.62 mm, 0.85 mm, 1.00 and 1.17 mm, with the respective normal lengths $N_{84(1)}$-$N_{84(5)}$ being 0.10 mm, 0.20 mm, 0.30 mm, 0.37 mm, and 0.42 mm.

The ratio of the normal length to chord length was then plotted against the chord distance for each of the eight chord distances, as illustrated in FIG. 7, labeled as line 84, that is, corresponding to foot end portion 84. As is evident from line 84 of FIG. 7, every ratio of measured normal length to chord length is less than 0.5. Accordingly, a housing configured with a foot end portion 84, having first and second segments $S_1$ and $S_2$ with a normal length to chord length ratio of less than 0.5 is a "short and wide" foot retention section that can be die cast in a high-temperature metal and has the requisite advantages discussed above.

Figure 6E:
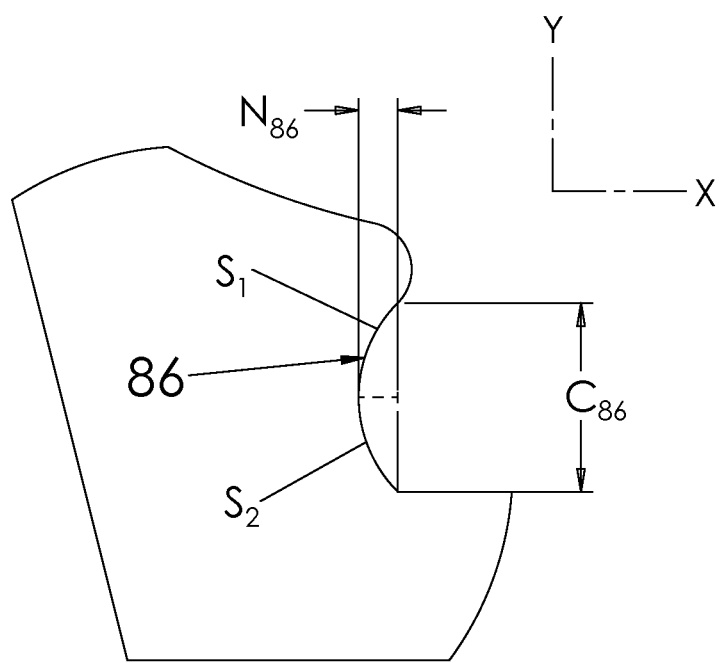

Finally, FIG. 6E illustrates foot end portion 86, which includes first segment $S_1$ and second segment $S_2$. As with the embodiment just described, first segment $S_1$ and second segment $S_2$ of foot end portion 86 in FIG. 6E are configured to be joined along an arc such that points connected from one segment to the other along the y-axis can be defined as a chord length $C_{86}$, that is, the distance between one point on first segment $S_1$ and one point on second segment $S_2$, with both points lying along a line parallel to the y-axis. Furthermore, a normal length $N_{86}$ is defined as the distance of a line extending perpendicular or normal from the chord length $C_{86}$ to the location where first segment $S_1$ and second segment $S_2$ intersect.

As with the examples above, chord lengths were measured along three lines perpendicular to the y-axis from a point on first segment $S_1$ to a point on second segment $S_2$. These measurements were taken at three various chord distances from the intersection of first and second segments $S_1$ and $S_2$, one of which $C_{86}$ is illustrated in FIG. 6E (in order to simplify the figure). A corresponding normal length $N_{86}$ was then taken normal from each chord line to the intersection of first and second segments $S_1$ and $S_2$. In one embodiment, the three measured chord lengths $C_{86(1)}$-$C_{86(3)}$ were 0.72 mm, 0.98 mm, and 1.17 mm, with the respective normal lengths $N_{86(1)}$-$N_{86(3)}$ being 0.10 mm, 0.20 mm, and 0.27 mm.

The ratio of the normal length to chord length was then plotted against the chord distance for each of the eight chord distances, as illustrated in FIG. 7, labeled as line 86, that is, corresponding to foot end portion 86. As is evident from line 86 of FIG. 7, every ratio of measured normal length to chord length is less than 0.5. Accordingly, a housing configured with a foot end portion 86, having first and second segments $S_1$ and $S_2$ with a normal length to chord length ratio of less than 0.5 is a "short and wide" foot retention section that can be die cast in a high-temperature metal and has the requisite advantages discussed above.

For each of the above-described foot end portion having first and second segments $S_1$ and $S_2$, each of the first and second segments $S_1$ and $S_2$ have a radius. In some embodiments, it has been found advantageous that a ratio of the radius of segments to the maximum chord length between the segments is larger than 1. Essentially, if first and second segments $S_1$ and $S_2$ have a radius that is too small, that is, the segments each have a large curve, the foot retention portion of the housing does not retain the torque element well.

For example, foot end portion 80 illustrated in FIG. 6B has a radius for first and second segments $S_1$ and $S_2$ that is approximately 6 mm and the largest chord length $C_{80}$ is approximately 1 mm. As such, the radius-to-chord length ratio is approximately 6. As this is above 1, the configuration of foot end portion 80 is favorable for retaining torque element 40.

Foot end portion 82 illustrated in FIG. 6C has a radius for first and second segments $S_1$ and $S_2$ that is essentially infinite, since the segments are essentially straight lines. The largest chord length $C_{82}$ is approximately 1 mm. As such, the radius-to-chord length ratio is essentially infinite. As this is above 1, the configuration of foot end portion 82 is favorable for retaining torque element 40.

Foot end portion 84 illustrated in FIG. 6D has a radius for first and second segments $S_1$ and $S_2$ that is approximately 2 mm and the largest chord length $C_{84}$ is approximately 1 mm. As such, the radius-to-chord length ratio is approximately 2. As this is above 1, the configuration of foot end portion 84 is favorable for retaining torque element 40.

Foot end portion 86 illustrated in FIG. 6E has a radius for first and second segments $S_1$ and $S_2$ that is approximately 0.7 mm and the largest chord length $C_{86}$ is approximately 1 mm. As such, the radius-to-chord length ratio is approximately 0.7. As this is below 1, the configuration of foot end portion 86 is not favorable for retaining torque element 40. Essentially, the curvature of first and second segments $S_1$ and $S_2$ are too large.

In some embodiments, the short and wide foot retention sections exemplified by housing 50 of FIGS. 2B, 2C, and 3, and by foot end portions 82, 84 and 86 of FIGS. 6C-6E, also provide an improved force relationship between housing 50 and torque elements 40. More specifically, the forces of the press fit between foot retention section 54 of housing 50 and foot portion 46 of torque element 40 are improved over prior systems.

Figure 8:
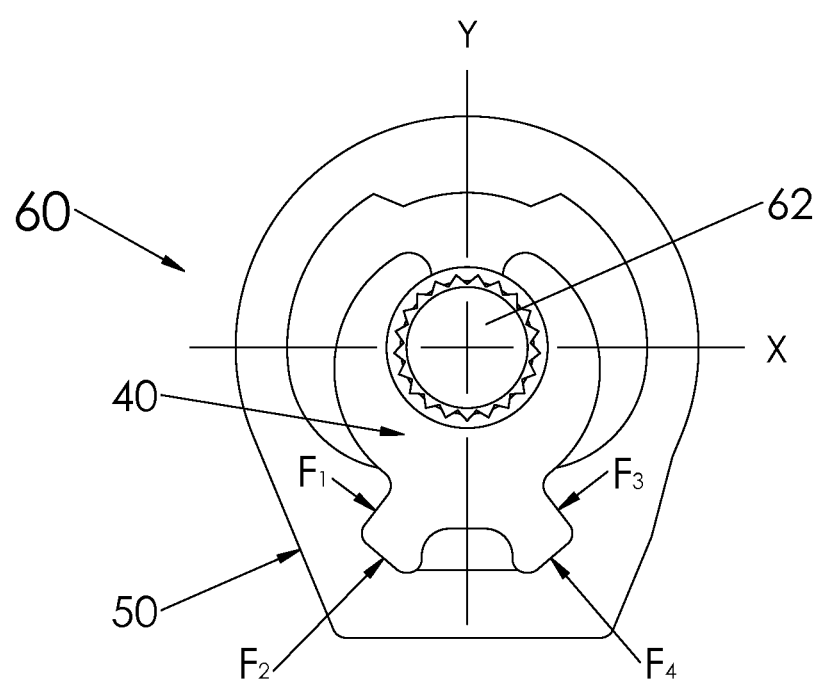
FIG. 8 is a front view of a friction clip assembly within a housing and illustrating forces in accordance with one embodiment.

FIG. 8 illustrates torque element retention system 60 and further illustrates the forces between foot retention section 54 of housing 50 and foot portion 46 of torque element 40. As illustrated, a first force $F_1$ is directed substantially perpendicular to first segment $S_1$ of first foot end portion 54a, a second force $F_2$ is directed substantially perpendicular to second segment $S_2$ of first foot end portion 54a, a third force $F_3$ is directed substantially perpendicular to third segment $S_3$ of second foot end portion 54b, and a fourth force $F_4$ is directed substantially perpendicular to fourth segment $S_4$ of second foot end portion 54b (first and second segments $S_1$ and $S_2$ of first foot end portion 54a and third and fourth segments $S_3$ and $S_4$ of second foot end portion 54b are not re-labeled in FIG. 8 so as to not overly complicate the Figure, but may be referenced in FIG. 2A-2C, which illustrate the identical torque element retention system 60).

As illustrated in FIG. 8, each segment $S_1$, $S_2$, $S_3$ and $S_4$ independently exerts a force $F_1$, $F_2$, $F_3$, and $F_4$, respectively, on foot portion 46 of torque element 40 that supports torque element 40, and thereby prevents its relative movement, in both the y-axis and x-axis direction. Stated another way, each segment $S_1$, $S_2$, $S_3$ and $S_4$ independently exerts a bi-directional force that supports torque element 40. Furthermore, in one embodiment, each of these forces $F_1$, $F_2$, $F_3$, and $F_4$ exert a substantially balance force in each of the y-axis and x-axis directions. In one embodiment, none of segments $S_1$, $S_2$, $S_3$ and $S_4$ exert any force on foot portion 46 of torque element 40 that is solely in either the x-axis or y-axis direction.

In one embodiment, the press fit between foot retention section 54 of housing 50 and foot portion 46 of torque element 40 is nearly symmetric about the y-axis and x-axis. This has the effect of allowing torque element 40 to remain accurately centered about the y-axis and x-axis during the press into the highly drafted surface retention section 54 of housing 50.

Figure 9:
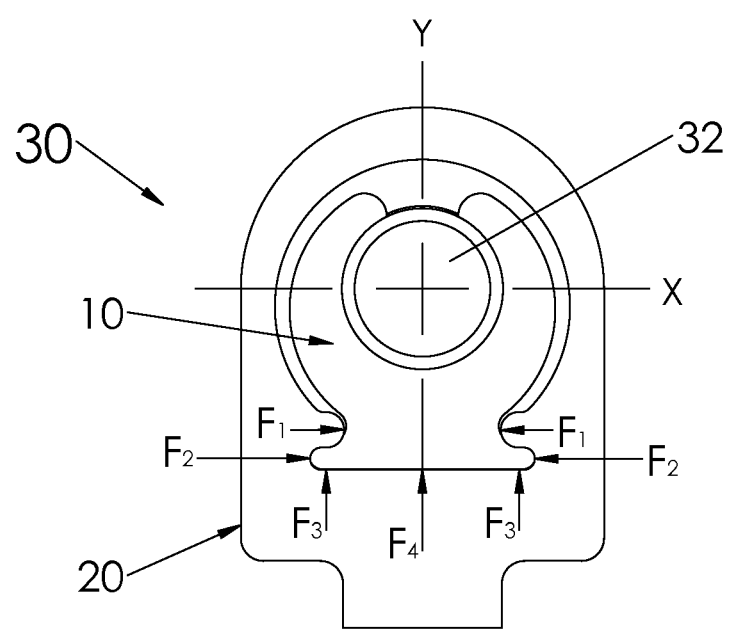
FIG. 9 is a front view of a friction clip assembly within a housing and illustrating forces in accordance with the prior art.

By contrast, the design associated with system 10 in FIGS. 1A-1D does not meet this configuration. FIG. 9 illustrates system 10 and the forces $F_1$, $F_2$, $F_3$, and $F_4$ that are exerted by housing 20 on torque element 10. As illustrated, none of the forces are bi-directional, that is, none support torque element 10 in both the y-axis and x-axis direction. Instead, each of the forces $F_1$, $F_2$, $F_3$, and $F_4$ are directed exclusively in either the y-axis or the x-axis direction. Furthermore, the system 10 configuration exerts a large normal force $F_4$ directed along a bottom surface of torque element 10. This is a large asymmetrical force that may disrupt the correct location of torque element 10 after it is inserted into housing 20.

Because the short and wide foot retention sections exemplified by housing 50 of FIGS. 2B, 2C, and 3, and by foot end portions 82, 84 and 86 of FIGS. 6C-6E eliminate these asymmetrical forces, proper alignment of torque element 40 can be better assured after it is inserted in housing 50.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A torque element retention system comprising:
   a housing having an opening;
   a torque assembly comprising a shaft and a torque element stacked along the shaft and configured substantially within the opening of the housing;
   wherein the torque element comprises an arm portion and a foot portion;
   wherein the opening comprises an arm opening section configured to receive the arm portion of the torque element in a clearance fit such that the torque element is not contacted by the housing in the arm portion, and a foot retention section configured to receive the foot portion of the torque element in a press fit such that the torque element is constrained by the housing in the foot portion;
   wherein the torque element retention system has a system axis through the center of the shaft and extending through the foot retention section such that first and second foot end portions of the foot retention section extend in opposite directions normal to the system axis in approximately equal distance;
   wherein the first and second foot end portions of the foot retention section each includes first and second non-parallel segments having no normal length to chord length ratio greater than 0.5 such that foot retention section is formable using die casting of metals with high-temperature melting points; and
   wherein the chord length comprises a distance from a first point on the first segment to a second point on the second segment along a first line that is parallel to the system axis, wherein the normal length comprises a distance from the chord length to a point of intersection of the first and second segments along a second line perpendicular to the system axis, and wherein the normal length to chord length ratio is the normal length distance divided by the chord length distance.

2. The torque element retention system of claim 1, wherein the first and second segments are substantially perpendicular to each other and approximately equal length such that each segment exerts a substantially balanced force on the torque element in the direction of the system axis and perpendicular thereto.

3. The torque element retention system of claim 1, wherein the first and second segments are configured to constrain the torque element thereby preventing its relative movement to the housing and such that each segment exerts a bi-directional force on the torque element that is neither parallel nor perpendicular to the system axis.

4. The torque element retention system of claim 1, wherein the first and second segments are configured to constrain the torque element thereby preventing its relative movement to the housing and such that each segment exerts a substantially symmetrical force on the torque element relative to an axis parallel to the system axis.

5. The torque element retention system of claim 1, wherein each of the first and second segments have a radius such that the radius divided by a maximum chord length for each of the first and second segments is greater than 1.

6. The torque element retention system of claim 1, wherein each of the first and second segments of each of the first and second foot end portions intersects at a point of the foot retention section that is furthest from the system axis.

7. The torque element retention system of claim 1, wherein each of the first and second segments of each of the first foot end portion the first and each of the first and second segments of the second foot end portion are configured to constrain the torque element thereby preventing its relative movement to the housing and such that each segment exerts a substantially symmetrical force on the torque element both relative to the system axis and to an axis parallel to the system axis.

8. A torque element retention system comprising:
   a housing having an opening;
   a torque assembly comprising a shaft and a torque element stacked along the shaft and configured substantially within the opening of the housing;
   wherein the torque element comprises an arm portion and a foot portion;
   wherein the opening comprises an arm opening section configured to receive the arm portion of the torque element in a clearance fit such that the torque element is not contacted by the housing in the arm portion, and a foot retention section configured to receive the foot portion of the torque element in a press fit such that the torque element is constrained by the housing exclusively in the foot portion;
   wherein the torque element retention system has a system axis through the center of the shaft and extending through the foot retention section such that the system axis divides the foot retention section approximately in half thereby forming first and second foot end portions each
   with at least a first and second non-parallel segments that constrain the torque element thereby preventing its relative movement to the housing;
   wherein the first and second non-parallel segments of the foot retention section have no normal length to chord length ratio greater than 0.5, such that the foot portion is self-broaching into the foot retention section of the housing; and
   wherein the chord length comprises a distance from a first point on the first segment to a second point on the second segment along the first line that is parallel to the system axis, wherein a normal length comprises a distance from the chord length to a point of intersection of the first and second segments along a second line perpendicular to the system axis, and wherein the normal length to chord length ratio is the normal length distance divided by the chord length distance.

9. The torque element retention system of claim 8, wherein a bi-directional force exerted by each of the first and second segments each prevent movement of the torque element in a direction of the system axis and in a direction perpendicular thereto.

10. The torque element retention system of claim 8, wherein a bi-directional force exerted by the first segment on the torque element is symmetrical to the bi-directional force exerted by the second segment on the torque element relative to an axis perpendicular to the system axis.

11. The torque element retention system of claim 8, wherein each of the first and second segments have a radius such that the radius divided by a maximum chord length for each of the first and second segments is greater than 1.

* * * * *